(12) United States Patent
Souders et al.

(10) Patent No.: US 7,957,222 B2
(45) Date of Patent: Jun. 7, 2011

(54) ACOUSTIC COMMUNICATION AND CONTROL FOR SEISMIC SENSORS

(75) Inventors: Keith A. Souders, Tampa, FL (US); Jamal Haque, Clearwater, FL (US); Andrew W. Guyette, Clearwater, FL (US); Edward R. Prado, Palm Harbor, FL (US); Richard Pereira Soares, Jr., Fredericksburg, VA (US)

(73) Assignee: Honeywell International, Inc., Morristown, NJ (US)

( * ) Notice: Subject to any disclaimer, the term of this patent is extended or adjusted under 35 U.S.C. 154(b) by 879 days.

(21) Appl. No.: 11/868,272

(22) Filed: Oct. 5, 2007

(65) Prior Publication Data

US 2009/0092002 A1    Apr. 9, 2009

(51) Int. Cl.
*G01V 1/00* (2006.01)
(52) U.S. Cl. ................................ 367/76; 340/870.07
(58) Field of Classification Search .............. 367/76; 340/870.07
See application file for complete search history.

(56) References Cited

U.S. PATENT DOCUMENTS

| | | |
|---|---|---|
| 3,074,636 A | 1/1963 | Baker et al. |
| 3,106,982 A | 10/1963 | Wade |
| 3,273,112 A | 9/1966 | Hobson |
| 3,296,587 A | 1/1967 | Baker |
| 3,302,745 A | 2/1967 | Ikrath |
| 3,302,746 A | 2/1967 | Ikrath |
| 3,638,178 A | 1/1972 | Stephenson |
| 3,940,733 A | 2/1976 | Johnson et al. |
| 4,091,366 A | 5/1978 | Lavallee |
| 4,209,783 A * | 6/1980 | Ohyama et al. ............. 340/825 |
| 4,294,513 A | 10/1981 | Nelson et al. |
| 4,547,869 A | 10/1985 | Savit |
| 4,589,285 A | 5/1986 | Savit |
| 5,051,965 A | 9/1991 | Poorman |
| 5,469,403 A * | 11/1995 | Young et al. ................. 367/6 |
| 5,515,509 A | 5/1996 | Rom |
| 5,850,592 A | 12/1998 | Ramanathan |
| 5,861,846 A | 1/1999 | Minter |

(Continued)

FOREIGN PATENT DOCUMENTS

WO    2008/042774    4/2008

OTHER PUBLICATIONS

Briscoe, H. W. "Study of the Feasibility of Long-Range Seismic Communications." 1972. Bolt Beranek and Newman, Inc., Cambridge, MA.

(Continued)

*Primary Examiner* — Mark Hellner
(74) *Attorney, Agent, or Firm* — Shumaker & Sieffert, P.A.

(57) ABSTRACT

A method for wireless communication in a seismic sensor network is disclosed. The method comprises providing a first acoustic device having at least one seismic sensor with communication and control data to communicate over an acoustic energy wave on a first communications channel. The first acoustic device generates the acoustic energy wave with a first wave intensity. The first acoustic device is configured to receive a reflection of the generated wave at a prescribed signal sensitivity level based on a network configuration. If the first wave intensity is below the prescribed signal sensitivity level, the first wave intensity of the acoustic energy wave is tuned to the prescribed signal sensitivity level to interpret the communication and control data provided by the first communications channel.

20 Claims, 5 Drawing Sheets

U.S. PATENT DOCUMENTS

| | | | |
|---|---|---|---|
| 6,236,889 B1 * | 5/2001 | Soykan et al. | 607/30 |
| 6,274,863 B1 | 8/2001 | Kersey | |
| 6,308,137 B1 | 10/2001 | Underhill et al. | |
| 6,469,639 B2 | 10/2002 | Tanenhaus et al. | |
| 6,681,887 B1 | 1/2004 | Kragh et al. | |
| 6,724,319 B1 | 4/2004 | Knaack et al. | |
| 6,728,165 B1 | 4/2004 | Roscigno et al. | |
| 6,859,831 B1 | 2/2005 | Gelvin et al. | |
| 6,928,030 B2 | 8/2005 | Chamberlain et al. | |
| 7,035,240 B1 | 4/2006 | Balakrishnan et al. | |
| 7,216,053 B2 | 5/2007 | Rakkola et al. | |
| 7,304,976 B2 | 12/2007 | Mao et al. | |
| 7,307,915 B2 * | 12/2007 | Kimball | 367/134 |
| 2002/0037737 A1 * | 3/2002 | Learned et al. | 455/526 |
| 2004/0006430 A1 * | 1/2004 | Harmon et al. | 702/14 |
| 2005/0047277 A1 | 3/2005 | Chamberlain et al. | |
| 2005/0254344 A1 * | 11/2005 | Barras | 367/76 |
| 2006/0262645 A1 | 11/2006 | Van Baaren | |
| 2007/0223306 A1 | 9/2007 | Toennessen | |
| 2007/0223307 A1 | 9/2007 | Storteig et al. | |
| 2007/0286022 A1 | 12/2007 | Bull et al. | |
| 2008/0137476 A1 | 6/2008 | Eick et al. | |

OTHER PUBLICATIONS

Chen et al., "Source Localization and Beamforming", "IEEE Signal Processing Magazine", Mar. 2003, pp. 1-9, Publisher: IEEE.

Chen et al., "Coherent Acoustic Array Processing and Localization on Wireless Sensor Networks", "Proceedings of the IEEE", Aug. 2003, pp. 1154-1162, vol. 91, No. 8, Publisher: IEEE.

Stafsudd et al , "Analysis, Implementation, and Application of Acoustic and Seismic Arrays", "Acta Automatica Sinica", Nov. 2006, pp. 929-937, vol. 32, No. 6.

Werner-Allen et al., "Monitoring Volcanic Eruptions With a Wireless Sensor Network", "Wireless Sensor Networks: Second European Workshop on Sensor Networks", Jan. 2005, pp. 108-120, Publisher: IEEE, Published in: Istanbul, Turkey.

Ammar et al., "Wireless Sensor Network Node with Asynchronous Architecture and Vibration Harvesting Micro Power Generator", Joint sOc-EUSAI Conference, Oct. 2005, Publisher: TIMA Laboratory, Published in Grenoble, France.

Calhoun et al, "Design Considerations for Ultra-Low Energy Wireless Microsensor Nodes", IEEE Transactions on Computer, Jun. 6, 2005, vol. 54, No. 6, Publisher: IEEE.

Wills et al., "Low-Power Acoustic Moden for Dense Underwater Sensor Networks", Proceedings of WUMNet '06, Sep. 25, 2006, Published in Los Angeles, CA.

U.S. Appl. No. 12/392,499, titled "Communication in a Seismic Sensory Array", filed Feb. 25, 2009.

U.S. Appl. No. 12/331,763, titled "Event-Based Power Management for Seismic Sensors", filed Dec. 10, 2008.

* cited by examiner

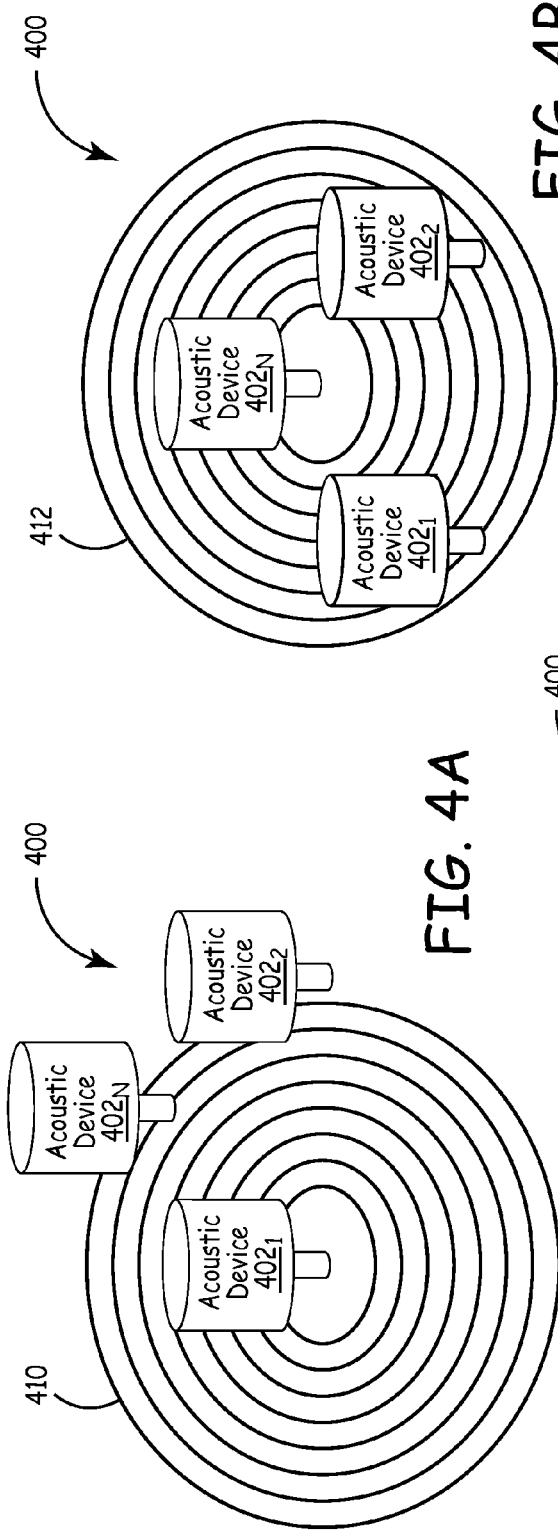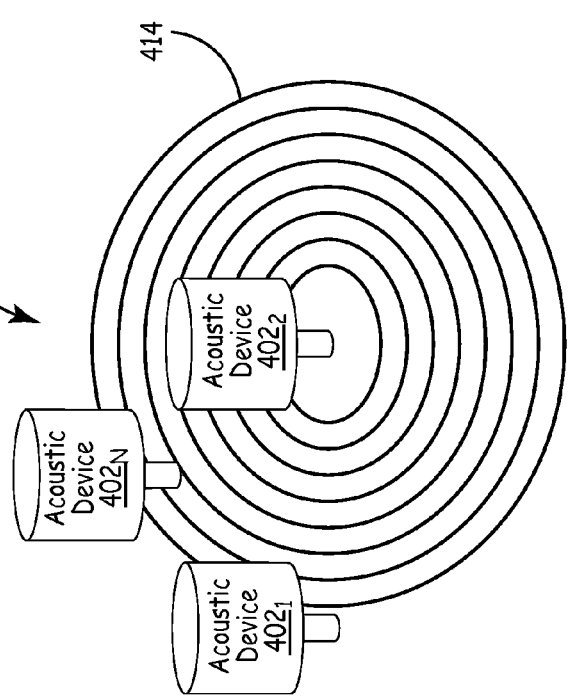
FIG. 4A
FIG. 4B
FIG. 4C

ACOUSTIC COMMUNICATION AND CONTROL FOR SEISMIC SENSORS

BACKGROUND

By design, seismic sensors detect seismic activity as waves of acoustic energy that travel through or on the surface of the Earth. Networks of these surface and sub-surface seismic sensors are deployed for a variety of applications where detection and processing of seismic activity is required. For example, the sensor network will communicate recordings of seismic activity at a remote location to a recording device through wired connections such as electrical and fiber optic cables.

As the functions and capabilities for seismic sensor networks increase, communication between these seismic sensor networks is often desired. Moreover, in environments where wired communications between seismic sensors is not feasible or not a suitable option, alternate transmission mediums are desired, including wireless communications. To date, providing any form of wireless communications between seismic sensor networks is susceptible to detection and disruption.

SUMMARY

The following specification discloses at least one embodiment of acoustic communication and control for seismic sensors. Particularly, in one embodiment, a method for wireless communication in a seismic sensor network is provided. The method comprises providing a first acoustic device having at least one seismic sensor with communication and control data to communicate over an acoustic energy wave on a first communications channel. The first acoustic device generates the acoustic energy wave with a first wave intensity. The first acoustic device is configured to receive a reflection of the generated wave at a prescribed signal sensitivity level based on a network configuration. If the first wave intensity is below the prescribed signal sensitivity level, the first wave intensity of the acoustic energy wave is tuned to the prescribed signal sensitivity level to interpret the communication and control data provided by the first communications channel.

DRAWINGS

These and other features, aspects, and advantages are better understood with regard to the following description, appended claims, and accompanying drawings where:

FIGS. 4A to 4C are block diagrams illustrating another method for providing acoustic communications and control in a seismic sensor network.

The various described features are drawn to emphasize features relevant to the embodiments disclosed. Like reference characters denote like elements throughout the figures and text of the specification.

DETAILED DESCRIPTION

Embodiments disclosed herein relate to acoustic communication and control for seismic sensors that provide a concealed or secure form of communication in a seismic sensor network. In at least one embodiment, the seismic sensors use at least one form of acoustic communication over a communications channel for control and communication data. The communications channel disclosed here operates concurrently and without disruption during standard seismic detection. For example, the channel enables the sensors to communicate control and communication data related to, without limitation, sensor synchronization, sensor timing, or sensor health monitoring between the sensors of the seismic sensor network.

The embodiments disclosed here address at least one method of transmitting acoustic energy waves to provide wireless communication between the seismic sensors. In one implementation, patterns of the energy waves will use a communications protocol to provide the communication data. For example, generating an acoustic energy wave includes, but is not limited to, inserting a tuned rod into the ground where the tuned rod is coupled to a transmitter of a first seismic sensor. The rod is configured to emit at least one frequency within the acoustic energy wave specifically "tuned" for the transmitter. The at least one tuned frequency is detectable by a receiver of at least a second seismic sensor. Moreover, the tuned energy wave provides a unique identity for each of the sensors in the network. The unique identity allows each of the seismic sensors to communicate substantially simultaneously. At least one alternate implementation uses an un-tuned rod and transmitter that emits random frequencies. The un-tuned transmitters are identifiable by the pattern of waves for a serial form of communications over at least one of the random (un-tuned) frequencies.

The acoustic energy waves disclosed here comprise electrical, mechanical, and electro-mechanical seismic energy waves. In one or more implementations, the distance between the sensors, the makeup and density of the material the sensors are buried in, intended monitoring applications, and the complexity of the communication will dictate a required intensity of each energy wave. In addition, the amount of communication data transmitted on each energy wave depends upon (1) the seismic transmitter generating the energy wave and (2) the precision and speed of the seismic receiver detecting and processing each of the energy waves.

Figure 1:
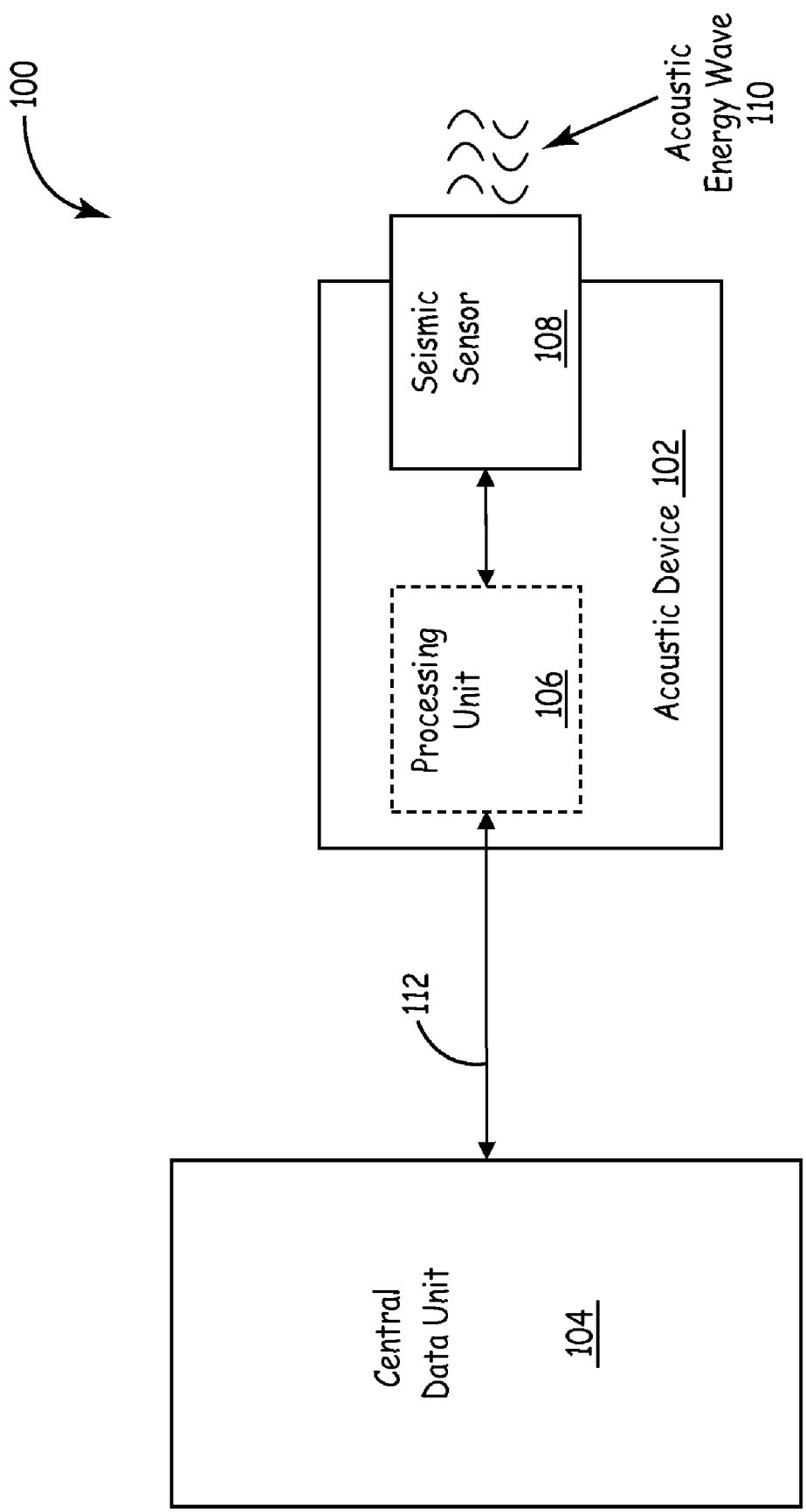
FIG. 1 is a block diagram of an embodiment of an electronic system having an acoustic device.

FIG. 1 is a block diagram of an electronic system 100 having an acoustic device 102. The system 100 further comprises a central data unit 104 in communication with the acoustic device 102. For ease of description, a single acoustic device 102 is shown in FIG. 1. It is understood that the system 100 is capable of accommodating any appropriate number of acoustic devices 102 (for example, one or more acoustic devices 102) in communication with the central data unit 104, as further disclosed below with respect to FIG. 2.

The acoustic device 102 further comprises a processing unit 106 and a seismic sensor 108 communicatively coupled to the processing unit 106. In the example embodiment of FIG. 1, the processing unit 106 comprises at least one of a microprocessor, a microcontroller, a field-programmable gate array (FPGA), a field-programmable object array (FPOA), a programmable logic device (PLD), or an application-specific integrated circuit (ASIC). The seismic sensor 108 is operable to generate and receive an acoustic energy wave 110 with a first wave intensity. The central data unit 104 is operable to provide communication and control data for the acoustic device 102 to communicate using the seismic sensor 108. In one implementation, the central data unit 104 is communicatively coupled to the processing unit 106 by a data interface 112. In one embodiment, the central data unit 104 is configured to further process the communication and control data provided by the data interface 112. The data interface 112 comprises, without limitation, an electrical connection such as Ethernet or twisted pair copper wiring, a fiber optic connection, and a wireless network connection similar to a wireless area network (WIFI) or a metropolitan area network (WIMAX) connection.

The processing unit 106 is further operable to configure the seismic sensor 108 to receive a reflection of the generated wave at the prescribed signal sensitivity level for monitoring configurations. For example, the communication and control data can comprise sensor synchronization, sensor timing, or sensor health messages for monitoring a network of acoustic devices 102 having the seismic sensors 108 in a concealed environment. Moreover, if at least one acoustic device 102 in the network indicates an inability to send and receive data, the disabled acoustic device 102 will re-route further messages to alternate acoustic devices 102 within the network to avoid any disruptions in communication traffic. In one implementation, the synchronization monitoring disclosed here comprises issuing a periodic "power-up" message between each of the seismic sensors 108 in the sensor network to conserve operating power. The decreased energy consumption provided by the synchronization monitoring extends operating cycles of the sensor network. In addition, the processing unit 106 can time stamp the communication and control data to monitor sensor timing.

In operation, the acoustic device 102 configures the seismic sensor 108 to communicate over the acoustic energy wave 110 on a first communications channel, as further described below with respect to FIG. 2. In one implementation, the first communications channel comprises at least one secure communications channel for sensitive control and communications data. The acoustic device 102 tunes the first wave intensity of the seismic sensor 108 to interpret the communication and control data provided by the first communications channel based on a prescribed signal sensitivity level. In the example embodiment of FIG. 1, the prescribed signal sensitivity level is configured for a seismic sensor network comprising a plurality of acoustic devices 102 having the seismic sensor 108. Moreover, the acoustic devices 102 are positioned to monitor seismic activity for a predetermined monitoring area based on the prescribed signal sensitivity level.

In one implementation, the first communications channel is operable to provide substantially simultaneous communications over the acoustic energy wave 110 between a plurality of seismic sensors 108 in a seismic sensor network, as further disclosed below with respect to FIG. 3. The acoustic energy wave 110 transmits the communications and control data on the first communications channel at a first frequency using an acoustic communications protocol. The first frequency comprises a unique identifier for the acoustic device 102. In one implementation, the acoustic communications protocol comprises at least one form of binary data transmission of the communications and control data encompassing, but not limited to, asynchronous transmission, synchronous transmission, streaming data transmissions with message redundancy, data compression, data encryption, device handshaking, and the like. In at least one alternate implementation, the first communications channel is operable to provide serial communications over the acoustic energy wave 110, as further disclosed below with respect to FIGS. 4A to 4C.

Figure 2:
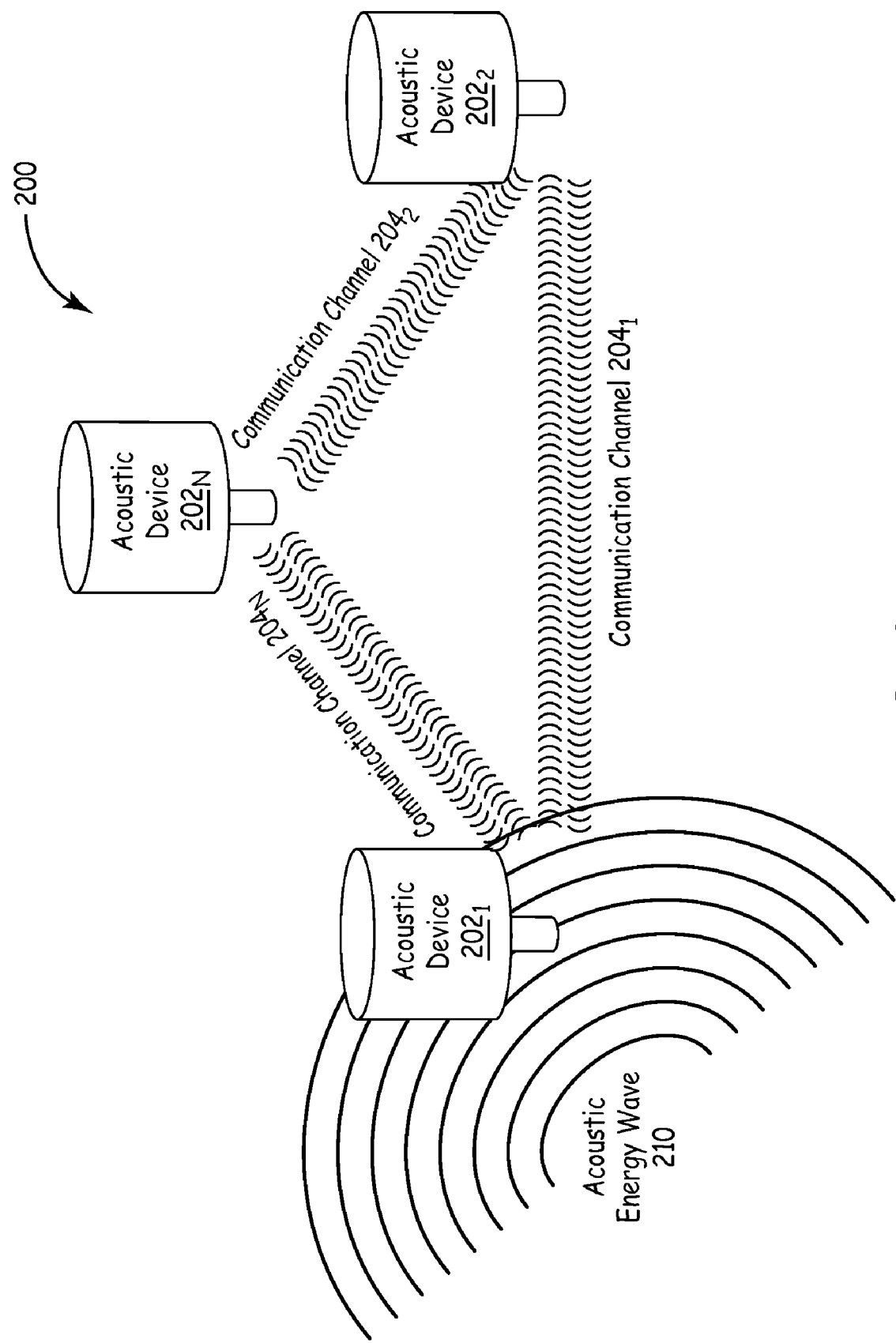
FIG. 2 is a block diagram of an embodiment of a seismic sensor network.

FIG. 2 is a block diagram of one embodiment of a seismic sensor network 200. The network 200 comprises a plurality of acoustic devices $202_1$ to $202_N$ configured for generating and receiving control and communications data over a wireless communications channel that is part of an acoustic energy wave 210. In the example embodiment of FIG. 2, the wireless communications channel comprise a first channel portion $204_1$ responsive to the acoustic devices $202_1$ and $202_2$, a second channel portion $204_2$ responsive to the acoustic devices $202_2$ and $202_N$, and a third channel portion $204_M$ responsive to the acoustic devices $202_N$ and $202_1$. It is understood that additional communications channel portions (for example, three or more communications channel portions) are suitable for use in the network 200. As shown in FIG. 2, the acoustic devices 202 are acoustically connected to provide the wireless communications channel 204 with control and communication data that can operate concurrently and non-disruptively during standard seismic detection.

In operation, the acoustic devices $202_1$ to $202_N$ are configured as a first sensor pair to provide acoustic communications for the network 200. The network 200 operates the first sensor pair in a communication monitoring process as further discussed below. In one implementation, the communication monitoring process comprises generating the acoustic energy wave 210 at the acoustic device $202_1$ with a first wave intensity. The first wave intensity is operable to transmit communications data at a first frequency using one or more portions of the wireless communications channel 204. For example, the acoustic device $202_2$ is configured to receive the acoustic energy wave 210 and the communications data on the first channel portion $204_1$ at a prescribed signal sensitivity level. Based on an acoustic communications protocol, the acoustic device $202_2$ communicates on the second channel portion $204_2$ to the acoustic device $202_N$. The acoustic device $202_N$ is configured to interpret the data from the acoustic energy wave 210 at the first wave intensity. At least one alternate implementation of FIG. 2 comprises generating the acoustic energy wave 210 with the first wave intensity at the acoustic device $202_2$.

Figure 3:
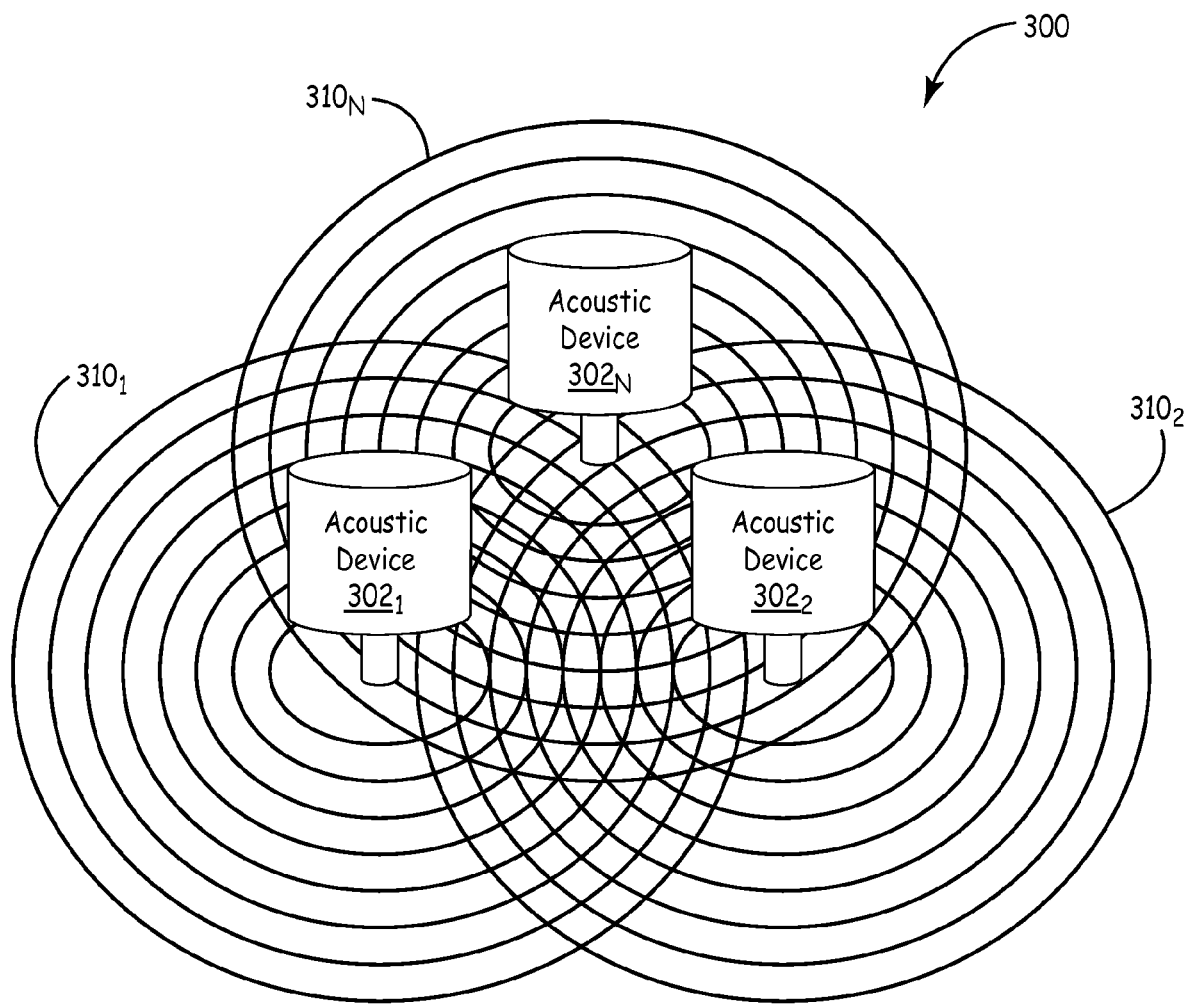
FIG. 3 is a block diagram illustrating a method for providing acoustic communications and control in a seismic sensor network.

FIG. 3 is a block diagram illustrating a method for providing acoustic communications and control in a seismic sensor network 300, similar to the network 200 of FIG. 2. The network 300 comprises the acoustic devices $302_1$ to $302_N$ as shown in FIG. 3. Further, each of the acoustic devices $302_1$ to $302_N$ generates the acoustic energy waves $310_1$ to $310_N$, respectively. In the example embodiment of FIG. 3, each of the acoustic devices $302_1$ to $302_N$ is capable of producing and detecting a unique identifier at an individual frequency value, realizing a full duplex network for communications. Moreover, the full duplex network disclosed here provides substantially simultaneous communications between each of the acoustic devices $302_1$ to $302_N$ based on the unique identifier for each of the acoustic devices.

FIGS. 4A to 4C are block diagrams illustrating a method for providing acoustic communications and control in a seismic sensor network 400, similar to the network 200 of FIG. 2. As shown in the network 400 of FIG. 4A, an acoustic device $402_1$ transmits a first polling message over an acoustic energy wave 410 to acoustic devices $402_2$ and $402_N$. The acoustic devices $402_2$ and $402_N$ detect the first polling message and prepare a possible response. For example, as shown in FIG. 4B, the acoustic device $402_N$ can respond over an acoustic energy wave 412 to the seismic sensors $402_1$ and $402_2$ in a serial form of communication (for example, a poll and response type of communication) using the acoustic communications protocol discussed above with respect to FIG. 2. Moreover, as shown in FIG. 4C, the acoustic device $402_2$ can respond over the acoustic energy wave 414 to the seismic sensors $402_1$ and $402_N$ with a serial form of communication using the acoustic communications protocol discussed above. Moreover, in the example embodiments of FIGS. 4A to 4C, the serial form of communication uses a fixed frequency value to transmit the communication and control data in a half duplex network over the acoustic energy waves 410, 412, and 414.

Figure 5:
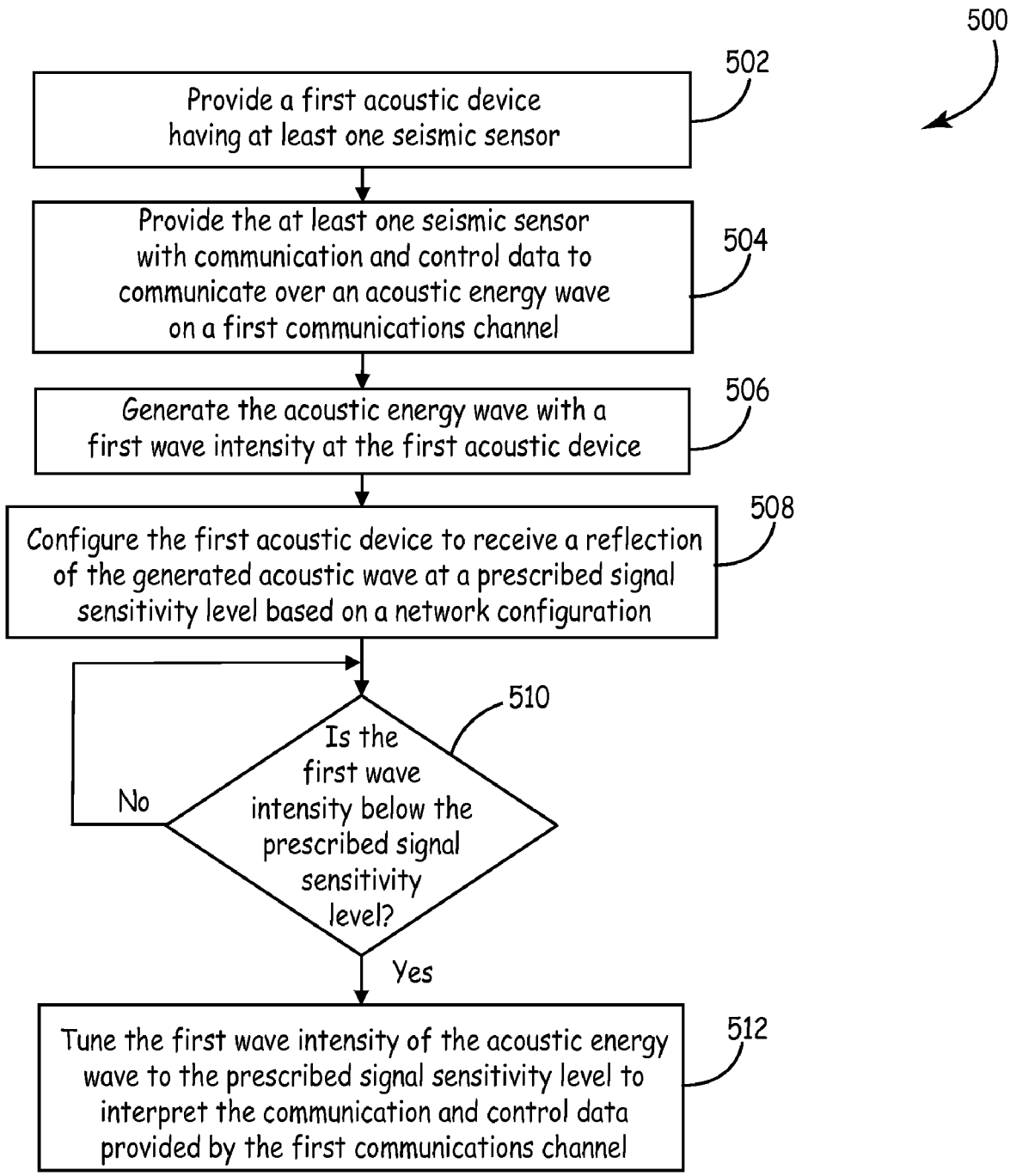
FIG. 5 is a flow diagram of a method for wireless communication in a seismic sensor network.

FIG. 5 is a flow diagram of a method 500 for wireless communication in a seismic sensor network. The method of FIG. 5 addresses implementing an acoustic communication protocol for the seismic sensor network on a wireless communications channel for control and communication data. The method 500 provides a first acoustic device with at least one seismic sensor (block 502), and provides the at least one seismic sensor with communication and control data to communicate over an acoustic energy wave on a first communications channel (block 504). In one implementation, the first acoustic device receives and transmits the communication and control data from and to a central data unit configured for data collection. The first acoustic device generates the acoustic energy wave with a first wave intensity (block 506). In one implementation, the first acoustic device transmits the communications and control data to at least one second acoustic device having a seismic sensor over the acoustic energy wave at a first frequency. The first frequency comprises a unique identifier for the first acoustic device.

The first acoustic device is configured to receive a reflection of the generated wave from the at least one second acoustic device at a prescribed signal sensitivity level based on a network configuration (block 508). In one implementation, the network is configured to provide substantially simultaneous communications between the first acoustic device and a plurality of additional acoustic devices having seismic sensors. In at least one alternate implementation, the first acoustic device communicates sequentially between the plurality of acoustic devices at a fixed frequency value.

If the first wave intensity of the reflected wave is below the prescribed signal sensitivity level (block 510), the first acoustic device tunes the first wave intensity of the acoustic energy wave to the prescribed signal sensitivity level to interpret the communication and control data provided by the first communications channel (block 512). If the first wave intensity remains substantially at the prescribed signal sensitivity level, the first acoustic device continues to monitor the prescribed signal sensitivity level of the acoustic energy wave at block 510.

While the embodiments disclosed have been described in the context of a seismic sensor array for acoustic communications, apparatus embodying these techniques are capable of being distributed in the form of a machine-readable medium of instructions and a variety of program products that apply equally regardless of the particular type of signal bearing media actually used to carry out the distribution. Examples of machine-readable media include recordable-type media, such as a portable memory device; a hard disk drive (HDD); a random-access memory (RAM); a read-only memory (ROM); transmission-type media, such as digital and analog communications links; and wired or wireless communications links using transmission forms, such as radio frequency and light wave transmissions. The variety of program products may take the form of coded formats that are decoded for actual use in a particular seismic sensor array for acoustic communications by a combination of digital electronic circuitry and software residing in a programmable processor (for example, a special-purpose processor or a general-purpose processor in a computer).

At least one embodiment disclosed herein can be implemented by computer-executable instructions, such as program product modules, which are executed by the programmable processor. Generally, the program product modules include routines, programs, objects, data components, data structures, and algorithms that perform particular tasks or implement particular abstract data types. The computer-executable instructions, the associated data structures, and the program product modules represent examples of executing the embodiments disclosed.

This description has been presented for purposes of illustration, and is not intended to be exhaustive or limited to the embodiments disclosed. Variations and modifications may occur, which fall within the scope of the following claims.

What is claimed is:

1. A method for wireless communication in a seismic sensor network, the method comprising:
generating an acoustic energy wave with a first wave intensity at a first acoustic device, the first acoustic device including at least one seismic sensor comprising communication and control data to communicate over the acoustic energy wave on a first communications channel;
configuring the first acoustic device to receive a reflection of the generated acoustic energy wave at a prescribed signal sensitivity level based on a network configuration; and
if the first wave intensity is below the prescribed signal sensitivity level, tuning the first wave intensity of the acoustic energy wave to the prescribed signal sensitivity level to interpret the communication and control data provided by the first communications channel.

2. The method of claim 1, further comprising implementing an acoustic communications protocol to transfer the communication and control data between the first acoustic device and a central data unit.

3. The method of claim 1, wherein generating the acoustic energy wave with the first wave intensity comprises transmitting the communications and control data over the acoustic energy wave at a first frequency.

4. The method of claim 1, wherein configuring the first acoustic device comprises communicating substantially simultaneously between the first acoustic device and a plurality of additional acoustic devices each having at least one seismic sensor.

5. The method of claim 1, wherein configuring the first acoustic device comprises communicating sequentially at a fixed frequency value between the first acoustic device and a plurality of additional acoustic devices each having at least one seismic sensor.

6. A non-transitory computer-readable medium including executable instructions that cause one or more processors to:
generate an acoustic energy wave with a first wave intensity at a first acoustic device, the first acoustic device including at least one seismic sensor and communication and control data to communicate over the acoustic energy wave on a first communications channel;
configure the first acoustic device to receive a reflection of the generated acoustic energy wave at a prescribed signal sensitivity level based on a network configuration; and
if the first wave intensity is below the prescribed signal sensitivity level, tune the first wave intensity of the acoustic energy wave to the prescribed signal sensitivity level to interpret the communication and control data provided by the first communications channel.

7. A method for providing acoustic communications with a seismic sensor network, the method comprising:
configuring at least a first acoustic device and a second acoustic device, each including at least one seismic sensor, as a first sensor pair; and operating the first sensor pair in a communication monitoring process, the process comprising:
  generating an acoustic energy wave at the first acoustic device with a first wave intensity to transmit communications and control data using a first communications channel;
  configuring the second acoustic device for a prescribed signal sensitivity level, the second acoustic device operable to receive the communications and control data on the first communications channel at the first wave intensity; and
  based on an acoustic communications protocol, communicating the communications and control data on the first communications channel to at least a third acoustic device configured to interpret the acoustic energy wave at the first wave intensity.

8. The method of claim 7, further comprising generating the acoustic energy wave at the second acoustic device with the first wave intensity.

9. The method of claim 7, wherein configuring the first and second acoustic devices as the first sensor pair comprises concealing the first sensor pair for at least one monitoring configuration.

10. The method of claim 7, wherein configuring the first and second acoustic devices as the first sensor pair comprises using the first wave intensity to provide a unique identifier for each of the acoustic devices in the seismic sensor network.

11. The method of claim 7, wherein generating the acoustic energy wave comprises transmitting the communications and control data at a first frequency.

12. The method of claim 7, wherein communicating the communications data to at least the third acoustic device comprises communicating substantially simultaneously between each of the acoustic devices in the seismic sensor network at the prescribed signal sensitivity level.

13. The method of claim 7, wherein communicating the communications data to at least the third acoustic device comprises communicating using at least one form of serial communications between each of the acoustic devices in the seismic sensor network at the prescribed signal sensitivity level.

14. A seismic sensor network comprising:
  a plurality of acoustic devices, each acoustic device of the plurality of acoustic devices comprising:
    at least one seismic sensor; and
    a processing unit in communication with the at least one seismic sensor, wherein the at least one seismic sensor is operable to generate and receive an acoustic energy wave with a first wave intensity; and
  a central data unit operable to provide communication and control data for the plurality of acoustic devices to transmit using the at least one seismic sensors of the plurality of acoustic devices;
  wherein each acoustic device of the plurality of acoustic devices is operable to:
    configure each of the at least one seismic sensors to communicate on the acoustic energy wave over a first communications channel; and
    tune the first wave intensity of the acoustic energy wave at each acoustic device of the plurality of acoustic devices to interpret the communication and control data provided by the first communications channel based on a prescribed signal sensitivity level.

15. The seismic sensor network of claim 14, wherein each acoustic device of the plurality of acoustic devices is further operable to receive a reflection of the generated wave at the prescribed signal sensitivity level in the concealed monitoring environment.

16. The seismic sensor network of claim 14, wherein the central data unit is configured to process the communication and control data provided by a data interface responsive to the first communications channel.

17. The seismic sensor network of claim 14, wherein the first communications channel is operable to allow substantially simultaneous communications between the plurality of acoustic devices in the seismic sensor network.

18. The seismic sensor network of claim 14, wherein the first communications channel is operable to allow serial communications between the plurality of acoustic devices in the seismic sensor network.

19. The seismic sensor network of claim 14, wherein the acoustic energy wave comprises a first seismic frequency operable to transmit the communications and control data over the first communications channel using an acoustic communications protocol.

20. The seismic sensor network of claim 14, wherein the acoustic energy wave comprises a unique identifier for each of the acoustic devices.

* * * * *